March 4, 1969     A. J. LEO ET AL     3,430,812
APPARATUS FOR INDICATING DEVIATION IN OUTPUT
OF A CYCLICALLY OPERABLE PUMP
Filed Aug. 3, 1967
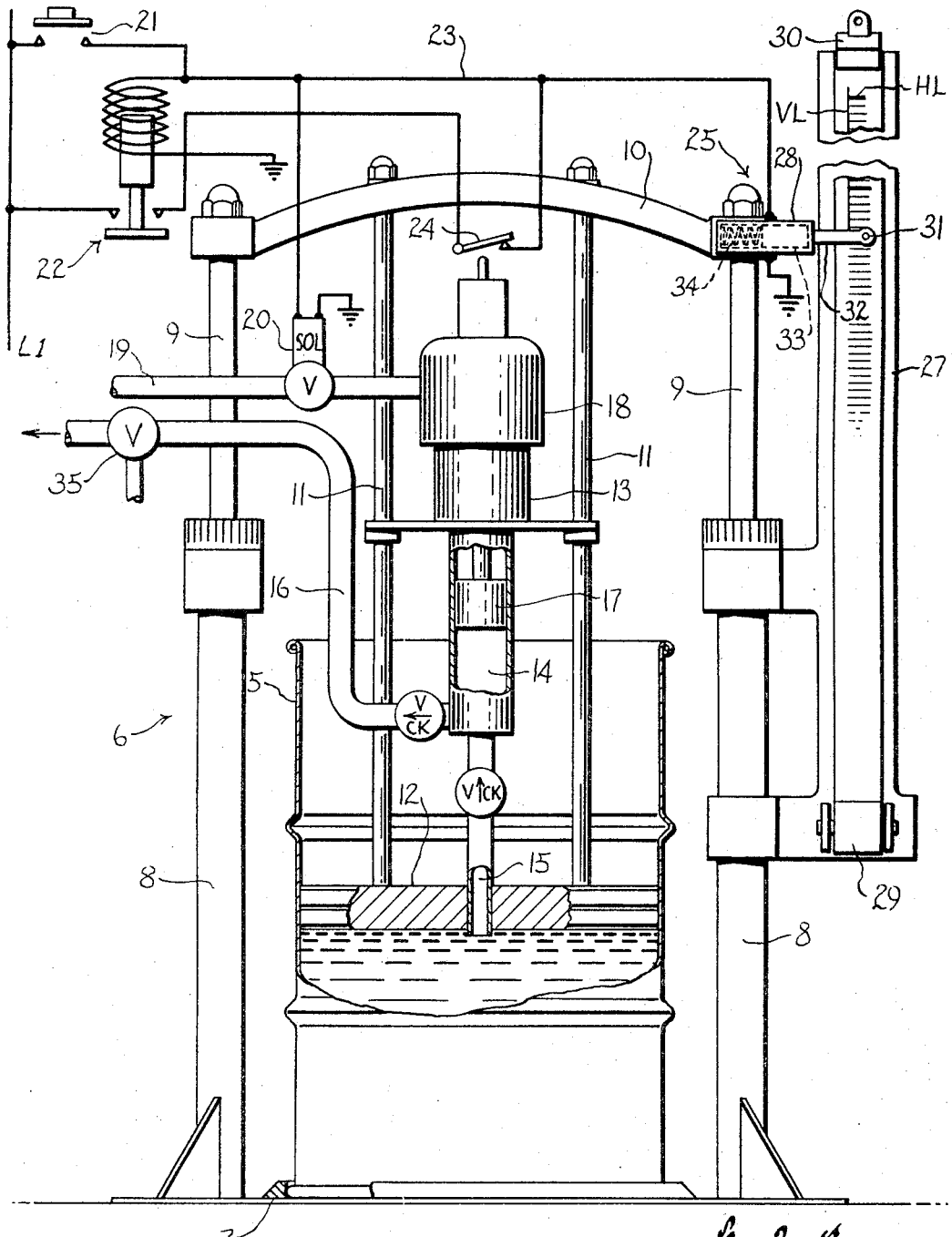
INVENTORS
Albert J. Leo
Edward C. Bielskis

United States Patent Office 3,430,812
Patented Mar. 4, 1969

3,430,812
APPARATUS FOR INDICATING DEVIATION IN OUTPUT OF A CYCLICALLY OPERABLE PUMP
Albert J. Leo, La Grange, and Edward C. Bielskis, Chicago, Ill., assignors to National Pectin Products Company, Chicago, Ill., a corporation of Illinois
Filed Aug. 3, 1967, Ser. No. 658,243
U.S. Cl. 222—14                6 Claims
Int. Cl. B67d 5/30

ABSTRACT OF THE DISCLOSURE

A follower riding upon the surface of pumpable material in a drum descends as material is withdrawn from the drum by a pump having its inlet opening to the underside of the follower. The follower is connected with movable indicator means to cause the latter to travel in a defined path along a stationary chart, proportionately to the descent of the follower. At the beginning and end of each cycle of operation of the pump an electric control circuit acts to cause the indicator means to produce indicia on the chart, the spacial relationship of which depicts the actual quantity of material withdrawn so that departure in that spacial relationship from a predetermined norm indicates deviation from the desired amount of material to be withdrawn and delivered during each cycle of pump operation.

---

This invention relates generally to apparatus for pumping material from a container thereof and delivering it to point of use, and refers more particularly to apparatus for pumping accurately measured quantities of a thixotropic food stabilizer into an ice cream mix or the like, as the mix is being prepared.

There are, of course, several ways in which predetermined amounts of such pumpable material can be withdrawn from a supply thereof and injected into an ice cream mix or the like; and while some of the devices heretofore available for achieving this purpose have been fairly satisfactory, those that were reliably accurate were quite expensive. Perhaps the simplest and least costly way of measuring the amount of pumpable material delivered is to use a piston pump and count the strokes made by the pump. As long as the pump chamber is completely filled with the material on each stroke of its piston, the accuracy of this way of measuring the amount of material pumped is better than plus or minus one percent, and for the delivery of a food stabilizer into the stream of an ice cream mix, that degree of accuracy is entirely acceptable.

However, in practice, there is always the possibility that something will interfere with uniform flow of material into the pump chamber. Dents in the drum in which the material is delivered and from which it is withdrawn are a cause of this difficulty. Such dents generally are caused by damage in transit. If present, they interfere with smooth downward travel of the follower plate which rides on the surface of the drum contents and has a piston-like fit in the drum so that, by its descent, it forces the material into the pump inlet.

Another source of possible mischance is the presence in the product of an occasional relatively large particle or piece of unpumpable material which becomes stuck at the inlet port of the pump. While good manufacturing practice would prevent the existence of such large particles or pieces in the product when shipped, gel-type stabilizers with which this invention is especially concerned are very sensitive to the addition of even slight amounts of water. In spite of precautionary warnings, plant personnel sometimes forget and introduce small amounts of water into the gel-stabilizer. This hydrates the colloid present in the stabilizer and forms a tough "ball" which can block the feed to the pump. Any such interference with or restriction of flow into the pump chamber will, of course, result in insufficient stabilizer being delivered to the mix, the fact of which will not be known since the pump will have made the number of strokes required to deliver the correct amount of stabilizer.

In recognition of the serious consequence of undetected inaccuracies in the amount of material delivered during a cycle of pump operation, yet realizing that the stroke counting approach is the least costly way of determining the amount of material withdrawn from a supply thereof and delivered to a point of use, it is an object of this invention to provide a reliable, simple and inexpensive device for measuring and recording the amount of product actually delivered by the pump. Thus, by simply checking the record, any deficiency in the amount of material delivered during a cycle of pump operation can be quickly detected and corrected.

With these observations and objects in mind, the manner in which the invention achieves its purpose will be appreciated from the following description and the accompanying drawing. This disclosure is intended merely to exemplify the invention. The invention is not limited to the particular structure disclosed, and changes can be made therein which lie within the scope of the appended claims without departing form the invention.

The drawing illustrates one complete example of the physical embodiment of the invention constructed according to the best mode so far devised for the practical application of the principles thereof, and in which:

The single figure is a front view of an apparatus such as that hereinbefore referred to, wherein a count of the number of strokes made by the piston of a reciprocating type pump is utilized to measure the amount of material withdrawn from a drum, provided with detecting and recording means in accordance with this invention, parts of the mechanical structure shown being broken away and in section and the instrumentalities for performing some of the functions of the apparatus being illustrated diagrammatically.

Referring to the drawing, the numeral 5 designates a partially emptied drum of pumpable material such as a thixotropic food stabilizer, in position on the pumping apparatus, designated generally by the numeral 6. This apparatus has a base 7 upon which the drum 5 is set and by which it is properly positioned with respect to the apparatus.

Rising from the base 5 are the cylinders 8 of a pair of pneumatic rams, the pistons 9 of which are connected by a yoke 10 to move up and down in unison. Fixed to to and depending from the yoke are two tie rods 11. the lower ends of which have a follower plate 12 secured thereto. This plate is of a size and of such construction as to have a piston-like relationship with the drum, it being understood that in setting up the apparatus for use, the rams are actuated to bring the follower plate to an elevation permitting the opened drum to be moved into position on the base.

During operation, the rams which are connectible in any conventional way with a source of air pressure, exert a steady downward pressure on the follower plate, which descends at a steady rate as long as a pump 13 which is mounted on the tie rods 11, is operating and nothing interferes with passage of the material from the drum into the cylinder 14 of the pump. The inlet of the pump is communicated with the underside of the follower plate 12 by a duct 15 and the outlet of the pump has a flexible hose 16 leading therefrom to a point of discharge, which may be a conduit through which flows the product to be supplied with the material being pumped from the drum. The inlet and outlet ports of the pump are, of course, equipped with the customary check valves, which for convenience are diagrammatically illustrated in the drawing.

The piston 17 of the pump has a fixed stroke imparted thereto by a suitable pneumatic motor 18 connected with the source of air pressure through a flexible supply line 19 under control of a solenoid valve 20. Energization of the solenoid valve to activate the motor is initiated by closure of a switch 21 which may be done by a push-button controlled solenoid 22. In this case a holding circuit 23 having a normally closed switch 24 and the switch 21 connected in series therein, maintains the switch 21 closed until the switch 24 is opened by a stroke counting device indicated generally by the numeral 25. The stroke counting device may be of any conventional type capable of being set to trip and open the switch 24 when the pump has made a predetermined number of strokes.

Thus, upon activation of the motor 18, the pump will operate for a cycle comprising a predetermined number of strokes, and if on each of its strokes the pump is fully charged, the amount of material withdrawn from the drum and delivered to the point of use will be within plus or minus one percent of the desired quantity. But if perchance something interferes with admission of the material into the pump cylinder, the amount of material delivered will be less than desired. Heretofore, such dificiency in the amount of material actually delivered would not be detected until the adverse effect thereof would be manifested in the quality of the product into which the material was pumped. This obvious objection is eliminated by the detecting and recording device of this invention, since it enables the operator to quickly ascertain if the desired amount of material has been delivered by a cycle of pump operation.

An extremely simple embodiment of the detecting and recording device, as illustrated on the drawing, consists essentially of an elongated strip chart support 27 fixedly mounted on one of the ram cylinders 8 and an indicia producing device 28 mounted on the yoke 10. The support 27 has provision at its bottom end for mounting a roll 29 of strip material. A length of the strip material drawn from the roll has its end attached to the top of the support, as by a spring clip 30, to provide a "strip chart" upon which the indicia producing device 28 records the amount of material actually delivered during each cycle of pump operation.

The indicia producing device may take any desired form; thus it could be of the type which punctures or perforates the chart in making its mark; or, as more or less diagrammatically shown on the drawing, it may be a marking stylus or pen 31 carried by an arm 32 mounted for up and down movement with the yoke 10 to form a vertical line VL on the strip chart and for horizontal in and out motion to form horizontal lines HL. To move the arm horizontally in and out, a solenoid 33 coacts with a spring 34 each adapted to produce linear motion of this arm in one direction. When the solenoid 33 is energized, the stylus or pen is in position to make the vertical line VL and when it is deenergized, the spring 34 acts to produce a horizontal line HL.

The solenoid 33 is connected into the holding circuit 23 to be energized whenever that circuit is closed. Accordingly, upon activation of the pump motor 18, the stylus or pen 31 is retracted from its extended spring maintained position and then, as it descends with the yoke and follower plate 12, it forms a vertical line on the chart. At the end of the pump cycle, when the pump has made the predetermined number of strokes, the counting device functions to open the holding circuit and this not only stops the pump motor, but also deenergizes the solenoid 33. The consequent release of the spring 34 results in another horizontal line HL being formed on the strip chart. The distance between this line and the preceding horizontal line is an accurate measure of the amount of material actually delivered by the pump during its cycle of operation. If that distance is less than that which results from the correct amount of material being withdrawn from the drum and delivered by the pump to the point of discharge, the operator knows that the pump failed for some reason or other, to deliver the amount of material expected from the number of strokes comprising the cycle. Obviously, of course, the extent by which the distance between the horizontal lines is less than it would be if the correct amount of material actually had been delivered, is an indication of the percentage of deficiency that must be made up. If desired, the strip chart can be transversely ruled, as shown, to facilitate making this percentage evaluation.

Also, if desired, a bypass valve 35 can be provided in the delivery duct 15 to permit the last portion of the drum contents to be pumped into the top of a new drum.

From the foregoing description, taken in connection with the accompanying drawing, it will be apparent to those skilled in the art that this invention removes the one deterrent to the use of the simple inexpensive stroke counting approach for the delivery of predetermined quantities of pumpable material, such as thixotropic food stabilizers.

What is claimed as our invention is:

1. Apparatus for delivering a desired predetermined amount of pumpable material from an open topped drum to a point of use, comprising the combination of:
   (A) a follower plate insertable into the open topped drum to rest upon the surface of the material in the drum and to descend as material is withdrawn from the drum;
   (B) a cyclically operable pump of the reciprocating type having a fixed stroke and an inlet opening to the interior of the drum, so that operation of the pump withdraws material from the drum for delivery to a point of use,
       the amount of material thus delivered with each stroke of the pump being the same as long as the pump receives a full charge of material on each stroke thereof,
           so that a count of the number of strokes made by the pump in a cycle of operation thereof is an accurate measure of the amount of material delivered during the cycle provided that the pump receives a full charge of material on each stroke;
   (C) controllable power drive means to operate the pump in successive cycles, each of which consists of a predetermined number of strokes; and
   (D) indicator means operatively connected with the follower plate to show whether or not the desired predetermined amount of material actually has been delivered during each cycle of operation of the pump.

2. The apparatus of claim 1, wherein said indicator means comprises:
   (A) a vertical chart support;
   (B) indicia producing means constrained to vertical travel along the chart support and operatively connected with the follower plate to move proportionally to change in the level of the follower plate; and
   (C) means automatically operable at the beginning and end of each cycle of operation of the pump to cause said indicia producing means to make an indication on a chart that is mounted on the chart support.

3. Apparatus for delivering a desired predetermined amount of pumpable material from an open topped drum to a point of use, comprising the combination of:
   (A) a follower plate insertable into the open topped drum to rest upon the surface of the material in the drum and to descend as material is withdrawn from the drum;
   (B) a cyclically operable pump of the reciprocating type having a fixed stroke and an inlet opening through the follower plate, so that operation of the pump withdraws material from the drum for delivery to a point of use, the amount of material thus delivered with each stroke of the pump being the same as long as the pump receives a full charge of material on each stroke thereof, so that a count of the number of strokes made by the pump in a cycle of operation thereof is an accurate measure of the amount of material delivered during the cycle provided that the pump receives a full charge of material on each stroke;

(C) controllable power drive means to cyclically operate the pump;

(D) stroke counting means to count the number of strokes made by the pump during a cycle of operation thereof and operatively connected with said power drive means to stop the same and terminate the cycle of operation of the pump when a predetermined number of strokes have been made; and (E) indicator means operatively connected with the follower plate to show whether or not the desired predetermined amount of material actually has been delivered during the cycle of operation of the pump.

4. The apparatus of claim 3, wherein said indicator means comprises:

(A) a vertical chart support;

(B) indicia producing means constrained to vertical travel along the chart support, and operatively connected with the follower plate to move proportionately therewith; and (C) means automatically operable at the beginning and end of each cycle of operation of the pump to cause the indicia producing means to make an indication on a chart that is mounted on the chart support.

5. Means for indicating and providing a record of the amount of pumpable material withdrawn from a container thereof by means of a cyclically operated pump, comprising:

(A) a follower to ride upon the surface of the material in the container, and to descend therein as material is withdrawn by the pump;

(B) a vertical stationary chart support;

(C) movable indicator means for producing indicia on a chart in place on said support;

(D) means constraining the indicator means to move proportionately with the follower and in a defined path along the chart support as material is withdrawn from the container, said indicator means being also movable transversely of said path to produce distinguishable indicia on a chart in place on said support; and (E) means to cause said indicator means to move transversely of said path at the beginning and end of each cycle of operation of the pump, so that the indicia thus formed on the chart provides a record of the amount of material actually withdrawn from the container during each cycle of operation of the pump.

6. Apparatus for delivering a desired predetermined amount of pumpable material from a container to a point of use, comprising the combination of:

(A) a cyclically operable pump of the reciprocating type having a fixed stroke and an inlet opening to the interior of the container, so that operation of the pump withdraws material from the container for delivery to a point of use, the amount of material thus delivered with each stroke of the pump being the same as long as the pump receives a full charge of material on each stroke thereof, so that a count of the number of strokes made by the pump in a cycle of operation thereof is an accurate measure of the amount of material delivered during the cycle, provided that the pump receives a full charge of material on each stroke;

(B) controllable power drive means to cyclically operate the pump;

(C) stroke counting means to count the number of strokes made by the pump during a cycle of operation thereof and operatively connected with said power drive means to stop the same and terminate the cycle of operation of the pump when a predetermined number of strokes have been made;

(D) a follower member in the container constrained to move along a defined path and responsive to reduction in the amount of material in the container, so that the position of said member along its path of movement depends upon the amount of material in the container, and change in the position of said member along its path of movement affords a measure of the material withdrawn by the pump; and (E) indicator means exteriorly of the container but operatively connected with said follower member to be responsive to movement thereof and thereby show whether or not the desired predetermined amount of material actually has been withdrawn from the container and delivered during each cycle of operation of the pump.

References Cited

UNITED STATES PATENTS

| 628,312 | 7/1899 | Gray et al. | 222—30 |
| 2,925,941 | 2/1960 | Bloxom | 222—261 |

SAMUEL F. COLEMAN, *Primary Examiner.*

U.S. Cl. X.R.

222—30, 261